Figure 1:
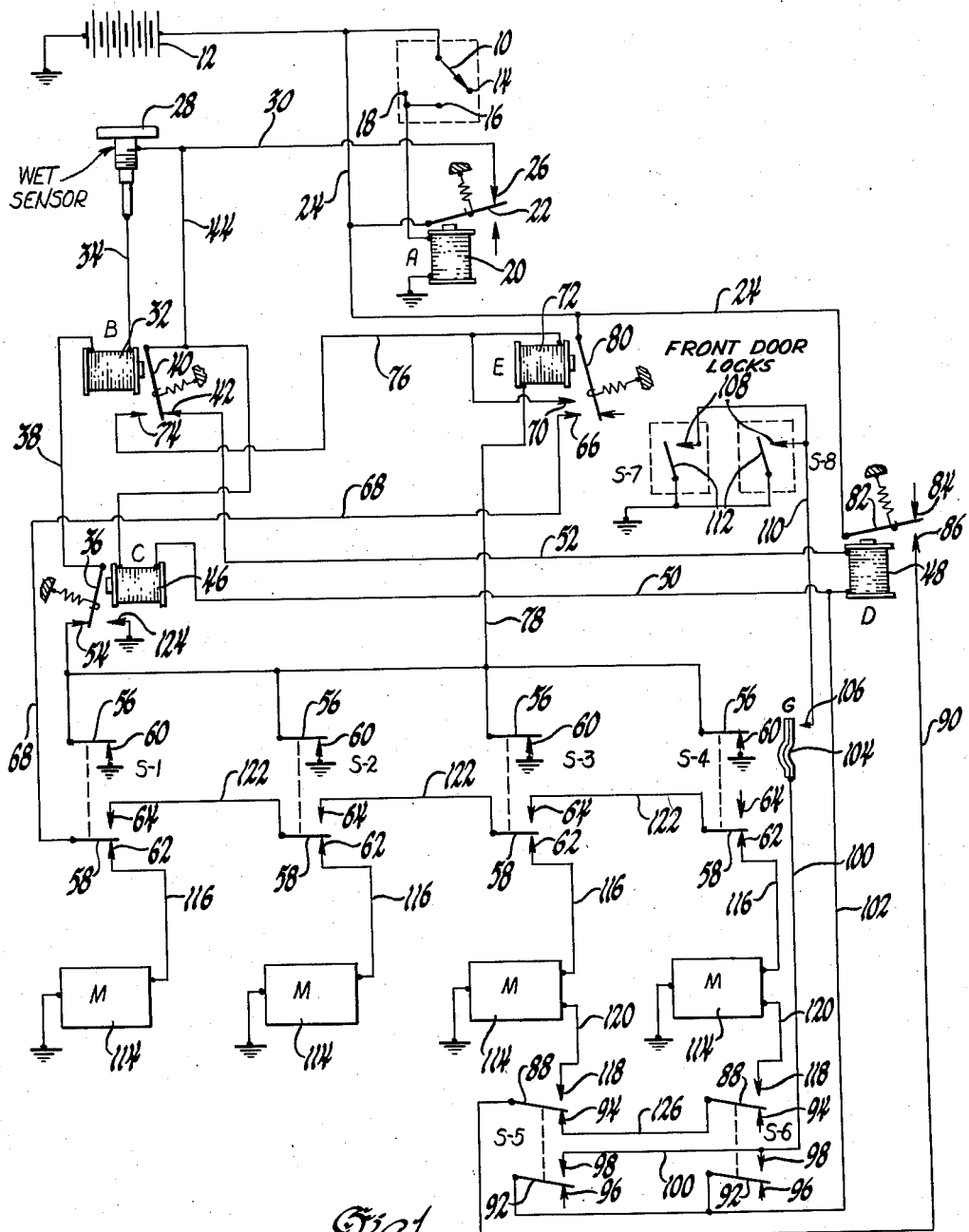

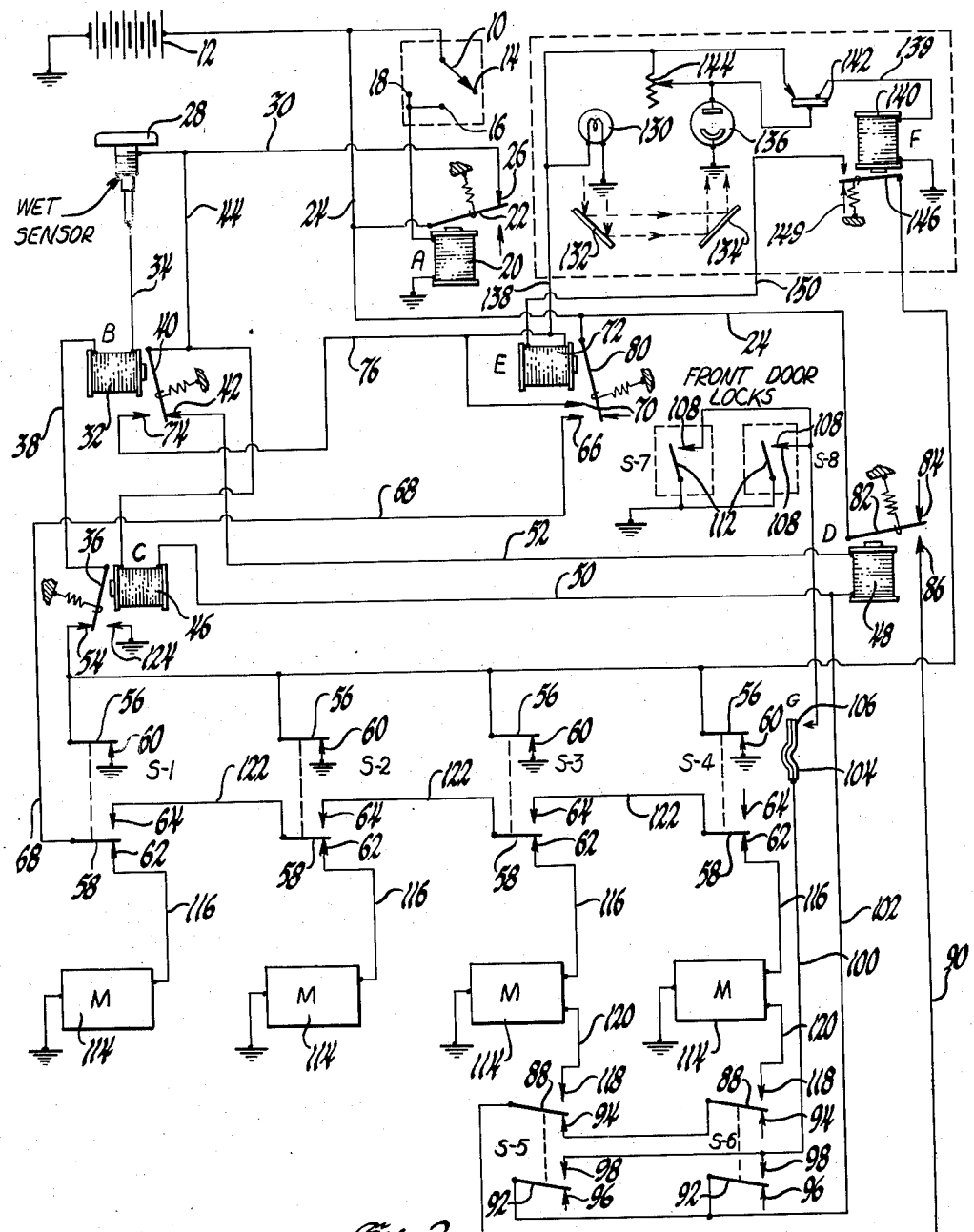

United States Patent Office 2,991,069
Patented July 4, 1961

2,991,069
VEHICLE WINDOW CONTROL SYSTEM
George W. Onksen, Charles W. Miller, and Kenneth R. Skinner, Anderson, Ind., assignors to General Motors Corporation, Detroit, Mich., a corporation of Delaware
Filed Mar. 14, 1958, Ser. No. 721,373
6 Claims. (Cl. 268—19)

This invention relates to vehicle window control systems and more particularly to vehicle window control systems for automatically opening and closing vehicle windows in response to atmospheric conditions both within and outside the vehicle body.

The systems of this invention are particularly intended for use with vehicle bodies having power operated windows controlled by the usual manual control switches, with the systems of this invention being connected in parallel with the manual control systems.

In one preferred embodiment of this invention for use in four door types of vehicle bodies, each door including a door window provided with an electric motor for moving the window between open and closed positions, the system is connected with the electric motors of each of the windows and includes a rain sensor responsive to atmospheric precipitation, such as rain or snow, to energize the system and thereby sequentially close any of the windows which may be in partial or full open position. The rain sensor is of the general type including spaced metallic contacts adapted to be bridged by at least one drop of water whereby the rain sensor is conductive only when wet. Thus, the system is responsive to atmospheric conditions outside the body to move any of the windows which may be in partial or full open position to closed position to thereby prevent damage to the interior appointments of the body.

Additionally, the system includes a thermostat within the body which is normally open and is adapted to close when the temperature within the body rises above a predetermined temperature, such as 120° F. The thermostat controls energization of the motors of the front door windows and, when closed, will energize these motors to move these windows to a half open position to thereby lower the temperature within the body, if the outside air temperature is less than the predetermined set temperature at which the thermostat closes. The thermostat will only energize the motors of the front door windows when there is no atmospheric precipitation such as rain, since otherwise the system will not operate to open any of the windows if there is such precipitation. Additionally, the thermostat is connected in a circuit including switches operated by the front door locks of the vehicle front doors whereby the doors must be in unlocked position before the front door windows will be opened. Thus, if the driver leaves the vehicle in locked position, none of the windows will be opened regardless of the temperature within the body. The entire system is connected to the vehicle ignition switch whereby the ignition switch must be in off position before the system will function in any manner.

In a second preferred embodiment of this invention, the system includes an additional feature preventing movement of any of the vehicle windows to a closed position should any person be positioned within the body wherein a portion of his body, such as an arm, may project outwardly through any one of the window openings. This is particularly important where children are within the vehicle body. This feature includes a light source mounted on the right hand side of the rear package shelf and projecting a light beam forwardly across the right hand door window openings to a mirror mounted on the right hand side of the vehicle dashboard. The mirror reflects the light beam to a similar mirror mounted on the left hand side of the vehicle dashboard, with this mirror in turn reflecting the light beam across the left hand door window openings to a photo conductive cell mounted on the left hand side of the rear package shelf. The cell controls energization of a power relay which furnishes voltage to the electric motors of each of the door windows. If the photocell is not energized, the power relay cannot be energized so that none of the door windows can be moved to a closed position. Thus, if anyone is within the body and is located in such a position that the light beam is broken, the system will not operate.

The primary object of this invention is to provide a new and improved vehicle window control system. Another object of this invention is to provide an improved vehicle window control system for automatic closing and opening vehicle windows in response to atmospheric conditions both within and outside the vehicle body.

These and other objects of this invention will be readily apparent in the following specification and drawings, wherein:

FIGURE 1 is a circuit diagram according to one preferred embodiment of this invention; and FIGURE 2 is a circuit diagram according to another preferred embodiment of this invention.

Before proceeding wtih a description of the systems of this invention, it should be noted that the systems are described in conjunction with use in four door types of vehicle bodies, each door having a door window movable between open and closed positions with respect to the door opening window by means of an electric motor. However, it will be understood that the system is equally applicable to two door types of vehicle bodies, either with or without power operated rear quarter windows.

Referring now particularly to FIGURE 1 of the drawings, a vehicle window control system according to one embodiment of this invention will be described. The vehicle ignition switch 10, which controls operation of the vehicle power plant, is connected to one side of the vehicle battery 12 and may engage either an "off" contact 14, an "on" contact 16, or an "accessory" contact 18. Such an ignition switch arrangement is in commercial usage today and allows certain vehicle accessories, such as the radio, to be operated without operating the power plant of the vehicle. The coil 20 of a relay A is connected between ignition switch contacts 16 and 18 and ground. The armature 22 of relay A is normally closed to a contact 26 and is connected to a conductor 24 which is connected to one side of the battery 12. Contact 26 is connected to one side of a wet sensor 28 by means of a conductor 30. The wet sensor 28 is more fully described in copending application Serial No. 727,732, filed April 10, 1958, Kenneth R. Skinner, and assigned to the assignee of this invention. However, for the purposes of this invention, it is only necessary to understand that sensor 28 includes spaced metal contacts and that it will only conduct current when rain or other moisture bridges the spaced contacts.

The other side of the wet sensor 28 is connected to one side of the coil 32 of a sensitive relay B by a conductor 34. The other side of the coil 32 of relay B is connected to the armature 36 of a relay C by a conductor 38. The armature 40 of relay B is normally closed to contact 42 and is connected to conductor 30 by a conductor 44. The conductor 44 also connects conductor 30 with one side of the coil 46 of relay C, with the other side of the coil 46 being connected to one side of the coil 48 of a power relay D by a conductor 50. The other side of the coil 48 of relay D is connected to the contact 42 by a conductor 52. Thus, it can be seen that the coil 48 of relay D and the coil 46 of relay C are normally shorted out when the ignition switch is in "off" position and relay A is not energized.

The armature 36 of relay C normally engages contact 54 which is connected parallel with one armature 56 of four double-pole, double-throw switches numbered S-1, S-2, S-3 and S-4. The armatures 56 are ganged to armatures 58, and when the vehicle windows are in full or partially open position, the armatures 56 engage grounded contacts 60 of each of the switches and the armatures 58 engage contacts 62 of each of these switches. The switches S-1 through S-4, inclusive, are each mounted in one of the doors of the body, with switch S-1 being mounted in the left hand rear door, switch S-2 being mounted in the right hand rear door, switch S-3 being mounted in the left hand front door, and switch S-4 being mounted in the right hand front door. The switches are shown in their position when the door windows are in full or partially open position, and are operated by the vehicle windows. When each window is in fully closed position, the switch armature 56 of the respective switch is out of engagement with the grounded switch contact 60 and the switch armature 58 of the respective switch is in engagement with the switch contact 64 and out of engagement with the switch contact 62.

The switch armature 58 of switch S-1 is connected to one of the normally open contacts 66 of a power relay E by a conductor 68. The other normally open contact 70 of relay E is connected to one side of the coil 72 of relay E and also to the normally open contact 74 of relay B by a conductor 76. The other side of the coil 72 of relay E is connected in parallel with each of the switch armatures 56 by a conductor 78. The armature 80 of relay E is connected to conductor 24, as is the armature 82 of relay D, which normally engages the open contact 84 of the relay. The contact 86 of relay D is connected to the armatures 88 of a double-pole, double-throw switch S-5 by a conductor 90. The armatures 88 of the switch S-5 and the armature 88 of switch S-6, which is the same as switch S-5, are ganged to the armatures 92 thereof, and the switches S-5 and S-6 are shown in their position when the door windows are in open position. In this position of the windows, the armatures 88 engage open contacts 94, with contact 94 of switch S-5 being connected to armature 88 of switch S-6, and the armatures 92 engage open contacts 96. The other contacts 98 of switch S-5 and S-6 are interconnected by a conductor 100. Switches S-5 and S-6 are mounted in the left hand and right hand front doors respectively and are operated by the left hand and right hand front door windows respectively. The switches are shown in position when the front door windows are in half or fully open position, and when the windows are in closed position, the armatures 88 engage contacts 118 and the armatures 92 engage the contacts 98, armatures 92 are connected to one side of the coil 48 of relay D by a conductor 102. A thermostat G of known type includes a bimetallic armature 104 connected to conductor 100 and normally opens to contact 106 by a conductor 100. The thermostat is of a known type and is suitably mounted within the interior of the body. Thermostat G is of the reverse action type, that is, closing on a rise in temperature in the interior of the body, and is adjusted to close at 120° F. Contact 106 is connected to the contacts 108 of a pair of single-throw, single-pole switches S-7 and S-8 by a conductor 110. The armatures 112 of switches S-7 and S-8 are connected in series to ground. The switches S-7 and S-8 are respectively mounted in the left hand and right hand front doors of the body and are operatively interconnected with the door locks so that the switches are normally in open position, as shown, when the door locks are in locked position, and are closed to the contacts 108 when the door locks are in unlocked position.

Each of the doors of the vehicle body includes an electric motor 114, as previously mentioned, and the motors are each operatively connected to one of the vehicle windows in a known manner, as is common in production type four door vehicles, to move the vehicle windows between open and closed positions. The motors are of the reversible type, with the armatures and each of the field windings thereof grounded as shown. The armature and the up field winding of each of the respective motors 114 are connected to the contacts 62 of switches S-1 through S-4, respectively, by a conductor 116. The down windings and the armatures of the motors 114 in the left hand and right hand front doors are connected to contacts 118 of switches S-5 and S-6 by conductors 120.

The circuit is shown when the ignition switch is "off," the front door locks are in locked position, and each of the windows of the vehicle is in open position. Assuming first that the ignition switch is "off," all of the door windows are in full or partially open position and that it starts to rain whereby moisture bridges the spaced contacts of the wet sensor 28 to thereby establish a circuit between the conductors 30 and 34. A circuit will then be completed to the grounded contacts 60 of switches S-1 through S-4 across the coil 32 of relay B to energize the relay and close the armature 40 thereof to contact 74. This will complete a circuit from conductor 30 to the grounded contacts 60 of switches S-1 through S-4 across the coil 72 of relay E to energize the relay and move the armature 80 thereof into engagement with contacts 70 and 66, respectively. When the armature 80 of relay E engages contact 70, a back feed circuit is established through the coil 72 of the relay whereby, if the moisture on the wet sensor 28 happens to dry out so as to deenergize relay B, relay E remains energized.

When the armature 80 of relay E engages contact 66, a circuit is completed from battery 12 to ground across the armature and up field winding of the motor 114 of the left hand rear window to energize the motor and move this window to closed position. When this window is moved to closed position, the armature 56 of switch S-1 moves out of engagement with the contact 60 thereof, and the armature 58 of switch S-1 moves out of engagement with the contact 62 thereof, deenergizing the motor 114, and into engagement with the contact 64 thereof which is connected to armature 58 of switch S-2 by a conductor 122. Relay E remains energized by means of the grounded contact 60 of switches S-2 through S-4, and thus a circuit is completed from armature 80 and contact 66 of relay E to ground across the armature and up field winding of the motor 114 of the right hand rear window to energize the motor and move this window to closed position. When this window is moved to closed position, the armature 56 of switch S-2 moves out of engagement with contact 60 thereof deenergizing the motor 114, and the armature 58 thereof moves out of engagement with contact 62 thereof and into engagement with contact 64 thereof which is connected to armature 58 of switch S-3 by a conductor 122. Relay E remains energized by means of the grounded contacts 60 of switches S-3 and S-4 and thus the armature and up field winding of the motor 114 of the left hand front window are energized from the armatures 58 of switches S-1, S-2, and S-3, to move this window to closed position. When this window is moved to closed position, the armature 56 of switch S-3 moves out of engagement with the contact 60 thereof, and the armature 58 of the switch moves out of engagement with the contact 62 thereof, deenergizing the motor 114, and into engagement with the contact 64 thereof, which is connected to the armature 58 of switch S-4 by conductor 122. Relay E remains energized by means of the grounded contact 60 of switch S-4, and the armature and up field winding of the motor 114 of the right hand front window are energized from the armatures 58 of switches S-1 through S-4 to move this window to closed position. When this window is moved to closed position, the armature 56 of switch S-4 moves out of engagement with the contact 60 thereof, thus deenergizing relay E, and the armature 58 thereof moves out of engagement with contact 62 thereof, deenergizing the motor 114, and into engagement with the open contact 64 thereof.

When all of the windows are in closed position, it makes no difference whether the wet sensor 28 is wet or dry, since the coil of relay B cannot be energized when the armatures 56 of switches S-1 through S-4 are out of engagement with the contacts 60 of the switches. Although the preceding description assumes that all of the door windows are in full or partially open position, the system will work equally as well if one or more of the windows is in closed position, since the armatures 56 of the switches S-1 through S-4 are in parallel with relays B and E, and the armatures 58 of the switches are in series with each other and the armature 80 of relay E. It should also be remembered that the ignition switch must be in "off" position, otherwise relay A is energized to prevent energization of relay B even if the wet sensor 28 is wet.

Assuming now that the ignition switch is in "off" position, all door windows are in closed position, the front doors are closed but unlocked, and that there is no atmospheric precipitation, such as rain or snow, sufficient to wet the wet sensor 28 and connect the spaced contacts thereof.

When the door windows are in closed position and there is no atmospheric precipitation, such as rain or snow, relays B, C, D, and E are in their position as shown, and the armatures 88 of switches S-5 and S-6 are closed to contacts 118 while the armatures 92 are closed to contacts 98. Since the front doors are closed but unlocked, the armatures 112 of switches S-7 and S-8 are closed to contacts 108. Relay A is not energized since the ignition switch is off.

Assuming now that the above conditions are present and that the temperature within the body rises to 120° F. or greater because the sun is shining, for example, and all of the door windows are closed, as previously mentioned.

When the temperature within the body rises to 120° F. or greater, the bimetallic armature 104 of thermostat G closes to the contact 106 thereof. This completes a circuit from battery 12 to ground through conductor 24, the armature 22 and contact 26 of relay A, conductor 30, conductor 44, across the coil 46 of relay C, conductor 50, conductor 102, the armatures 92 and contacts 98 of switches S-5 and S-6, conductor 100, armature 104 and contact 106 of thermostat G, conductor 110, and contacts 108 and armatures 112 of switches S-7 and S-8. Relay C will be energized to close the armature 36 thereof to grounded contact 124, and relay D will also be energized from the armature 40 and contact 42 of relay B and conductor 52. Energization of relay D closes the armature 82 thereof to contact 86 to connect the battery 12 with the armature 88 and contact 118 of switch S-5. A further circuit to ground is then completed across the armature and down field windings of motor 114 of the left hand front door window to energize the motor and move the left hand front door window to a half open position. When the window is in this position, the armature 88 of switch S-5 opens to contact 118, deenergizing the motor 114, and closes to contact 94 of the switch. The armature 92 of the switch opens to contact 98 and closes to open contact 96, but relays C and D remain energized since the armatures 92 of switches S-5 and S-6 are in parallel. Closure of the armature 88 of switch S-5 to the contact 94 thereof connects the battery with the armature 88 and contact 118 of switch S-6 by conductor 126 to energize the armature and down field winding of the motor 114 of the right hand front door window to energize the motor and move this window to a half open position. When the window reaches this position, armature 88 of switch S-6 opens to contact 118, deenergizing the motor, and closes to open contact 94. Armature 92 of switch S-6 opens to contact 98, deenergizing relays C and D, and closes to open contact 96. The rear door windows are not controlled by thermostat 104, since opening of the front door windows to a half open position should reduce the temperature within the body to less than 120° F. Of course, if the outside temperature is 120° F. or greater, thermostat G will remain closed, but the front door windows will remain in their half open position without further movement since the armatures 92 of the switches are closed to open contacts 96.

Switches S-7 and S-8 are closed only when the front doors are in unlocked position as a safety measure. If the driver locks the front doors to prevent unauthorized entry, it would not be wise to open the front door windows to allow such unauthorized entry.

It will be remembered that the armature 36 of relay C is closed to the grounded contact thereof. Thus, if either front door window is being moved to a half open position due to the temperature within the body and it starts to rain, the wet sensor 28 will become wet to energize relay B and thus deenergize relay D to stop this movement of the front door windows. The front door windows will then be moved to fully closed position in the same manner as previously described, except that the ground for relay B is now across the armature 36 and contact 124 of relay C rather than across the armatures 56 and contacts 60 of switches S-1 through S-4. Thus, although relay D will be deenergized, relay C will remain energized until the wet sensor 28 becomes dry, assuming, of course, that thermostat G remains closed. Thus, atmospheric precipitation, such as rain, takes precedence over the temperature within the body.

FIGURE 2 of the drawings shows an automatic vehicle window control system according to another preferred embodiment of this invention. This system is substantially the same as that previously described except for a modification which provides a safety feature preventing closing of any of the door windows if a person happens to be in a position wherein some part of his body, such as an arm, may be within a door window opening so as to be injured if the door window of that particular opening is closed. This system includes a grounded light 130 mounted on the right hand side of the rear package shelf and projecting the light rays forwardly of the body across the right hand rear and front door window openings, a right hand side mirror 132 mounted on the right hand side of the dashboard at an angle of 45° to the light ray to focus the light rays, if not interrupted, on a left hand side mirror 134 mounted on the left hand side of the dashboard at an angle of 45° to the focused light rays. The left hand side mirror focuses the light rays across the left hand front and rear door window openings, if not interrupted to a grounded photocell 136 mounted on the left hand side of the rear package shelf. Thus, if any person is in a position adjacent any one of the window openings wherein his arm, for example, may be within the window opening, none of the windows will be closed. This safety feature is especially important where children may be within the vehicle and it starts to rain.

Since the system of FIGURE 2 is substantially the same as that of FIGURE 1, previously described, like numerals have been used for like parts and only a brief description of the modification of the system of FIGURE 2 will be given, since the system works the same as that of FIGURE 1 in all other respects.

A conductor 138 connects the light 130 to conductor 76 whereby the light 130 will become lighted when relay B is energized. The grounded coil 140 of a sensitive relay F is connected by conductor 139 to a transistor or semi-conductor amplifying device 142. The photocell 136 is connected between the base of transistor 142 and ground. The base of transistor 142 is also connected through a variable resistance 144 to conductor 138. The photocell, when excited, controls the bias voltage on the transistor to permit energization of the coil 140. The armature 146 of relay F is connected to the armatures 56 of the switches S–1 through S–4, and is normally closed to contact 149. Contact 148 is connected to one side of the coil 72 of relay E by conductor 150. Thus, as long as the photocell 136 is excited, relay F is energized to energize the power relay E. However, should the photocell not be excited due to a person being in position within the body where he interrupts the light rays, relay F is deenergized to deenergize relay E and prevent operation of any of the motors 114. Thus, it can be seen that the light and photocell arrangement controls the ground side of power relay E. The photocell 136 may either be a photoconductive cell or a photovoltaic cell since each will work with equal success in the system.

Thus, this invention provides a new and improved vehicle window control system.

We claim:

1. In combination with a vehicle body having a plurality of closures movable between open and closed positions by power means including a plurality of respective electric motors, a circuit for sequentially energizing the motors of any of said closures in open position comprising, a power source, a plurality of respective normally closed switch means connected in parallel across said power source and operated by respective closures, said switch means being opened thereby when a respective closure is in closed position, a rain sensor connected across said power source through said switch means and being conductive only when wet, a motor energization circuit connected across said power source, and including switch means energized in response to said rain sensor becoming wet for energizing said motor energization circuit, and a plurality of normally open series connected switch means respective to said closures and closed thereby when a respective closure is in closed position, each said switch means being connected across said power source through a respective motor and said motor energization circuit.

2. In combination with a vehicle body having a closure movable between open and closed positions with respect to a window opening by power means including an electric motor, a circuit for energizing said motor comprising, a power source, normally closed switch means connected across the power source and operated by said closure, said switch means being opened thereby when said closure is in closed position, a rain sensor connected between said power source and switch means and being conductive only when wet, a motor energization circuit connected across said power source through said motor and including normally open switch means connected across said power source through second normally closed switch means, and operating means for said second normally closed switch means including a semi-conductor amplifying device connected across said power source for energizing said operating means, a light source projecting a light beam across said window opening, and a light responsive device excited by said light beam and controlling a bias voltage on said semi-conductor amplifying device to control energization of said switch operating means.

3. In combination with a vehicle body having a closure movable between open and closed positions with respect to a window opening by power means including an electric motor, a circuit for energizing said motor comprising, a power source, normally closed switch means connected across the power source and operated by said closure, said switch means being opened thereby when said closure is in closed position, a rain sensor connected between said power source and switch means and being conductive only when wet, a motor energization circuit connected across said power source through said motor and including normally open switch means connected across said power source through second normally closed switch means, and operating means for said second normally closed switch means including a semi-conductor amplifying device connected across said power source for energizing said operating means, a light source projecting a light beam across said window opening, and a photocell excited by said light beam and regulating a bias voltage on said semi-conductor amplifying device to permit energization of said switch operating means as long as said light beam remains unbroken.

4. In combination with a vehicle body having a closure movable between open and closed positions with respect to a window opening by power means including an electric motor, a circuit for energizing said motor comprising, a power source, normally closed switch means connected across the power source and operated by said closure, said switch means being opened thereby when said closure is in closed position, a rain sensor connected between said power source and switch means and being conductive only when wet, a motor energization circuit connected across said power source through said motor and including normally open switch means connected across said power source through normally closed relay contacts, and means controlling energization of said relay including a semi-conductor amplifying device connected across said power source through said relay, a light source projecting a light beam across said window opening, and a light responsive device excited by said light beam and regulating a bias voltage on said semi-conductor amplifying device to permit energization of said relay as long as said light beam remains unbroken.

5. In combination with a vehicle body having a plurality of closures movable between open and closed positions with respect to respective window openings by power means including an electric motor for each closure, a circuit for energizing said motors comprising, a power source, normally closed switch means connected in parallel across the power source and operated by respective closures, said switch means being opened thereby when a respective closure is in closed position, a rain sensor connected between said power source and switch means and being conductive only when wet, and a motor energization circuit connected across said power source through said motors and including normally open switch means connected across said power source through second normally closed switch means, and operating means for said second normally closed switch means including a semi-conductor amplifying device connected across said power source for energizing said operating means, a light source projecting a light beam, means projecting said light beam across each of said window openings, and a light responsive device excited by said light beam and controlling a bias voltage on said semi-conductor amplifying device to control energization of said switch operating means.

6. In combination with a vehicle body having a door provided with a door latch and a door window movable between open and closed positions by power means including a reversible electric motor, a power source, normally closed switch means connected across said power source and opened by said window when said window is in closed position, a rain sensor connected across said power source through said switch means and being conductive only when wet, a first motor energization circuit connected across said power source through said motor and including switch means energized in response to said rain sensor becoming wet for energizing said motor to move said window to closed position, and a second motor energization circuit connected across said power source through said motor to move said window to open position and including normally closed switch means opened by said window in the open position thereof, said second motor energization circuit including a thermostat controlled by the temperature within the body, said thermostat being adapted to energize said motor when the temperature within the body exceeds a predetermined value, and switch means in circuit with said thermostat and normally closed when said door latch is in unlatched position, said last named switch means preventing energization of said motor by said thermostat when said door latch is in latched position.

References Cited in the file of this patent

UNITED STATES PATENTS

| | | | |
|---|---|---|---|
| 784,897 | Schwinger | Mar. 14, | 1905 |
| 2,499,544 | Vancil | Mar. 7, | 1950 |
| 2,576,816 | Wahlberg | Nov. 27, | 1951 |
| 2,617,972 | Nutter | Nov. 11, | 1952 |
| 2,640,958 | Davis | June 2, | 1953 |
| 2,731,588 | McLeod | Jan. 17, | 1956 |
| 2,801,844 | Cook | Aug. 6, | 1957 |